United States Patent
Lahti et al.

(10) Patent No.: US 9,478,866 B2
(45) Date of Patent: Oct. 25, 2016

(54) ORIENTATION AGNOSTIC MILLIMETER-WAVE RADIO LINK

(71) Applicants: Saku Lahti, Tampere (FI); Mikko Lampinen, Tampere (FI); Mikko Komulainen, Tampere (FI)

(72) Inventors: Saku Lahti, Tampere (FI); Mikko Lampinen, Tampere (FI); Mikko Komulainen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 14/278,767

(22) Filed: May 15, 2014

(65) Prior Publication Data

US 2015/0333724 A1    Nov. 19, 2015

(51) Int. Cl.
  *H01Q 1/24*      (2006.01)
  *H01Q 13/06*     (2006.01)
  *H01Q 1/50*      (2006.01)
  *H01P 1/201*     (2006.01)
  *H01Q 3/24*      (2006.01)
  *H04M 1/02*      (2006.01)

(52) U.S. Cl.
  CPC .............. *H01Q 13/06* (2013.01); *H01P 1/201* (2013.01); *H01Q 1/50* (2013.01); *H01Q 3/24* (2013.01); *H01Q 1/243* (2013.01); *H04M 1/0202* (2013.01)

(58) Field of Classification Search
  CPC ........ H01Q 1/24; H01Q 1/241; H01Q 1/242; H01Q 13/06; H01Q 1/50
  USPC ......................................... 343/702, 772, 906
  See application file for complete search history.

(56) References Cited

U.S. PATENT DOCUMENTS

| | | | |
|---|---|---|---|
| 6,433,747 B1* | 8/2002 | Cumro | H01Q 1/22 343/700 MS |
| 2015/0085459 A1* | 3/2015 | Pu | H01Q 1/243 361/782 |
| 2015/0280318 A1* | 10/2015 | Yang | H01Q 9/40 343/841 |

* cited by examiner

*Primary Examiner* — Hoang V Nguyen
(74) *Attorney, Agent, or Firm* — Forefront IP Lawgroup, PLLC

(57) ABSTRACT

Described herein are architectures, platforms and methods for implementing an orientation-agnostic millimeter-wave (mm-wave) antenna in a portable device.

18 Claims, 9 Drawing Sheets

ORIENTATION AGNOSTIC MILLIMETER-WAVE RADIO LINK

BACKGROUND

An increasing number of wireless communication standards as applied to a portable device and a trend towards ever smaller, slimmer and lighter portable devices may cause major design challenges for antennas or antennas. Antennas represent a category of components that may fundamentally differ from other components in the portable device. For example, the antenna may be configured to efficiently radiate in free space, whereas the other components are more or less isolated from their surroundings.

Antennas operating at millimeter wave (mm-wave) frequencies—for high data rate short range links—are expected to gain popularity. One example of such a system is called wireless WiGig, which operates at the 60 GHz frequency band. In addition, utilization of the mm-wave radio systems is projected to play a major role for standards such as 5G cellular radio. Typically these short range mm-wave radio systems require an unobstructed line-of-sight (LOS) between a transmitter and a receiving antenna. With the LOS requirement, an orientation of the transmitting and receiving antennas may require their respective main lobe to face each other for maximum radio link. Current antenna designs for mobile devices such as laptop computers, tablets, smartphones, etc. are limited in coverage and incur high losses at mm-wave operating frequencies.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for implementing an orientation-agnostic millimeter-wave (mm-wave) antenna or antennas in a portable device.

For example, a waveguide structure within the portable device is utilized as a medium for transmitting and/or receiving radio frequency (RF) signals such as mm-wave RF signals or mm-wave frequencies. In this example, an open-end of the waveguide structure acts as an antenna. The antenna, in this case, may be disposed in a device chassis-outer surface, a device chassis-inner surface or within close proximity of a housing perimeter of the portable device for line-of-sight (LOS) mm-wave wireless communication with another portable device or base station.

While the open-end of the waveguide structure is utilized as the antenna, its other end may be connected to a RF module through a RF signal transition component such as a RF connector. For example, the RF module may be disposed to a location in a printed circuit board (PCB) of the portable device. In this example, the RF connector may be mounted to the PCB in order to facilitate a transition between two different signal path mediums (i.e., microwave structure medium and a transmission line of the PCB). The transmission line may be, for example, a microstrip line, a stripline, a co-planar wave guide, another waveguide or any other kind of transmission line, or combination or derivative of different transmission line types. In this example, the RF connector receives one end of the waveguide structure, and couples the other one end of the waveguide structure to the transmission line which is linked to the RF module in the PCB. The RF module may be fabricated in the PCB and the transmission line couples the RF module to the mounted RF connector.

In an implementation, impedance matching of the antenna may utilize a plastic material along the edges of the portable device. For example, the open-end of the waveguide structure is disposed on a plastic material cover of the portable device. In this example, the plastic material cover may have a uniform or planar surface that may be configured to have different dielectric materials in order to facilitate impedance matching in the waveguide structure.

Figure 1:
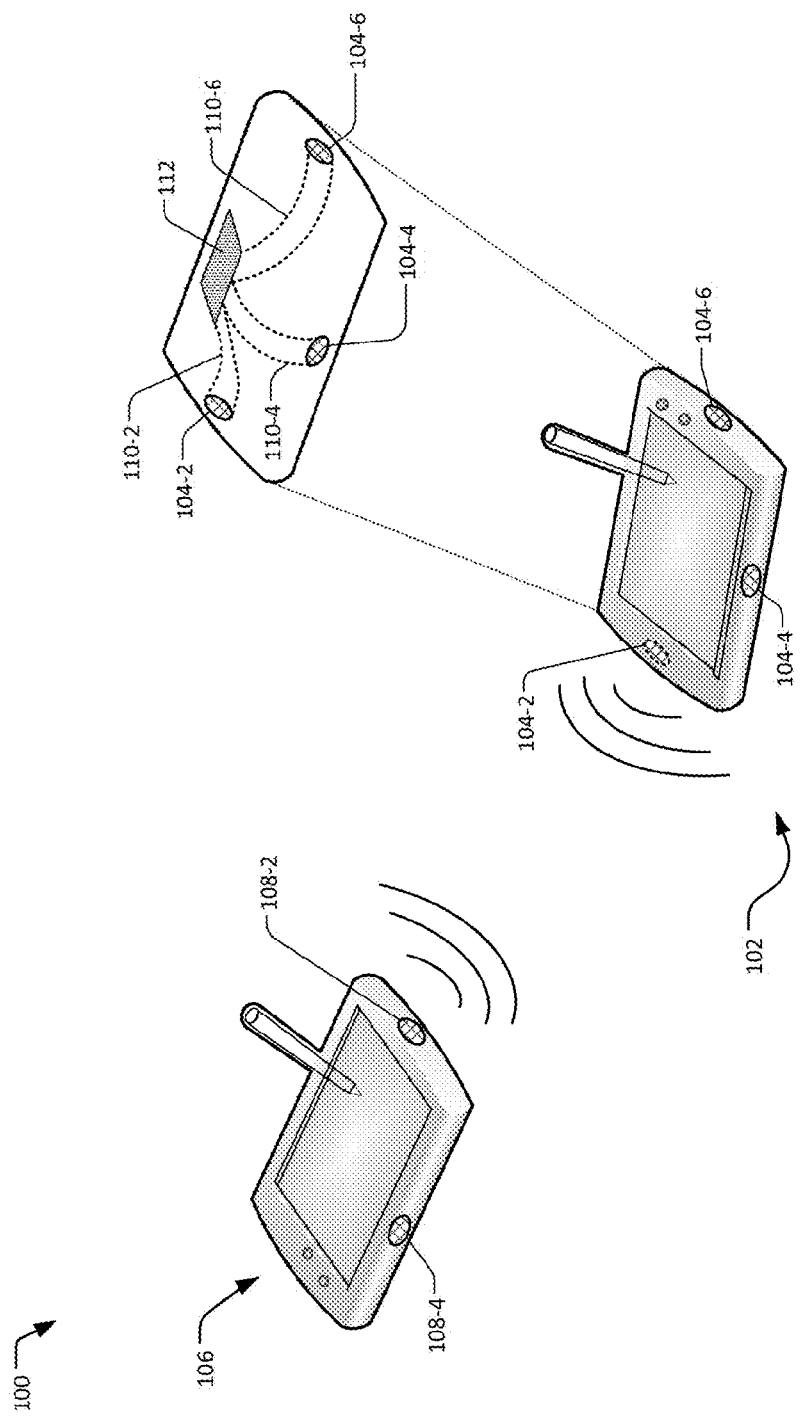
FIG. 1 is an example arrangement of millimeter-wave (mm-wave) portable devices during a line-of-sight (LOS) wireless communication.

FIG. 1 is an example arrangement 100 of millimeter-wave (mm-wave) portable devices during a line-of-sight (LOS) wireless communication. The arrangement 100 shows a portable device 102 with antennas 104, and another portable device 106 with antennas 108. The arrangement 100 further illustrates a chassis of the portable device 102 with corresponding waveguides 110 for the antennas 104, and a radio frequency (RF) module 112.

The portable device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. The portable device 102, for example, may communicate with the other portable device 106 in a network environment. The network environment, for example, includes a cellular network configured to facilitate communications between the portable device 102 and the other portable device 106.

As shown, the portable device 102 is a mm-wave portable device due to its feature or capability to operate at WiGig operating frequencies. The portable device 102, for example, utilizes the antenna 104-2 in a LOS wireless communication with the other portable device 106. The LOS wireless communication, for example, is operating at frequency range 60-100 GHz where an obstruction in between the portable devices may easily reduce signal strength during the wireless communication. In the above example, the antenna 104-2 is an open-end of a waveguide structure such as the waveguide 110-2.

In an implementation, the antenna 104-2 is optimally disposed on at least one edge of the portable device 102. For example, the waveguide 110-2 may extend from the RF module 112 to a top-edge of the portable device 102. In this example, the open-end of the waveguide 110-2 is the antenna 104-2 that is configured to provide mm-wave wireless communication. Depending upon configured sensitivity of the antenna 104-2, the portable device 102 may enter into LOS wireless communication with the other portable device 106 in relatively shorter distances (e.g., ten meters).

The antenna 104-2 of the waveguide 110-2 may include different shapes and/or configurations. For example, the antenna 104-2 may have a tapered end, a horn shape, a circular shape, or a conical configuration. In this example, the different shapes and/or configuration may correspond to different radiation patterns, beam configurations, etc. For example, a horn-shaped antenna 104-2 may have a narrower beam width and higher directivity as compared to a circular-shaped antenna 104-2. In this example, other configurations such as waveguide width, waveguide length, etc. may further be considered in arriving at above conclusion.

With continuing reference to FIG. 1, the portable devices 102 and 106 may detect which one of their respective antennas are aligned with one another. For example, as shown, the portable devices 102 and 106 establish a LOS wireless communication link and thereafter detect which of their respective antennas are aligned with one another. In this example, the portable devices 102 and 106 may detect that their respective antennas 104-2 and 108-2 may have a higher signal strength as compared to their other antennas such as between the antennas 104-4 and 108-4. Thus, the portable devices 102 and 106 may activate and utilize their corresponding antennas 104-2 and 108-2 in transmitting or receiving high data rates during the LOS wireless communication. In another implementation, other forms of detection such as a use of separate antenna within the portable devices may be utilized in selecting which antennas 104 or 108 are utilized during the LOS wireless communication.

In an implementation, the RF module 112 facilitates transmission or reception of data in the form of wireless signals through the antenna 104. For example, an RF connector (not shown) couples one end of the waveguide 110-2 to a transmission line (not shown) that links to the RF module 112. In this example, the RF module 112 may utilize the waveguide 110-2 and its open-end (i.e., antenna 104-2) for transmitting or receiving the wireless signals. The RF module 112 may be assembled in a PCB while the RF connector may be mounted on the PCB.

Although the example arrangement 100 illustrates in a limited manner basic components of mm-wave wireless communications between the portable devices 102 and 106, other components such as battery, one or more processors, SIM card, etc. were not described in order to simplify the embodiments described herein.

Figure 2:
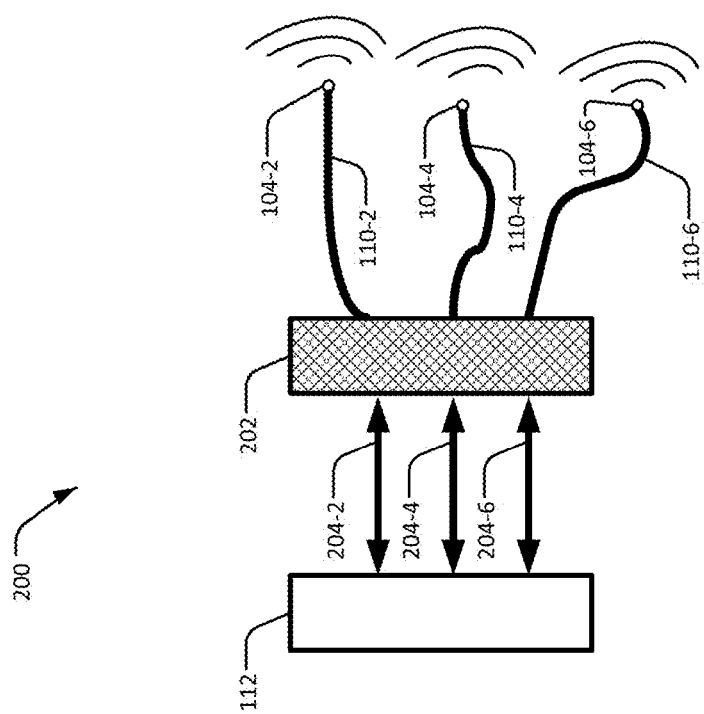
FIG. 2 is an example apparatus configured to implement millimeter-wave (mm-wave) wireless communication in a portable device.

FIG. 2 illustrates an example apparatus 200 that is configured to implement mm-wave wireless communications in the portable device 102. As shown, the apparatus 200 includes the RF module 112, one or more RF connectors 202, transmission lines 204, the waveguides 110 and the antennas 104.

As an example of present implementations herein, the portable device 102 may utilize multiple antennas 104 during the mm-wave wireless communications. For example, the waveguides 110 are optimally routed to different locations in the portable device 102. In this example, the respective open-ends of the waveguides 110 are utilized as the antennas 104.

The optimal routing of the waveguides 110 may be based upon: available space in the portable device 102, the location of the RF module 112, upon a physical size of the antenna 104, or a desired radiation pattern or coverage of the antenna 104. For example, the waveguide 110-2 is fabricated to be shorter in length than the waveguide 110-4 because the antenna 104-2 is closer to the RF module 112 as compared to present location of the antenna 104-4. In this example, internal dimensions of the waveguide 110-2 may have a different configuration as compared to the waveguide 104-2. The reason being, the difference in waveguide lengths may correspond to different forms of reflection and signal losses within the waveguide (i.e., mm-wave signal paths).

In another example, the waveguide 110-4 is equal in length to the waveguide 110-6 because the RF module 112 is disposed in between the two waveguides, and that the available space within the portable device 102 allows mirror-like waveguide positioning layout. In this example, the internal dimensions of the waveguides 110-4 and 110-6 are the same. The reason being, the open ended waveguides 110-4 and 110-6 may be configured to resonate at the same frequency (e.g., 60 GHz). At this resonant frequency and for the same waveguide lengths, the waveguides 110-4 and 110-6 may have the same internal dimensions to transfer maximum power.

As an example of present implementations herein, the RF connector 202 is a RF signal transition component that may facilitate a transition between two different signal path mediums during transmission and reception of the mm-wave wireless signals. For example, the RF module 112 utilizes the transmission line 204 to connect to the RF connector 202. In this example, the transmission line 204 is a type of electrical transmission line medium that may be fabricated using printed circuit board (PCB) technology, and is used to convey mm-wave wireless signals. Planar transmission line may, for example, be of a microstrip line, strip line or co-planar waveguide type. Alternatively, the transmission line 204 may be of no-planar type such as co-axial or another waveguide. Furthermore, the transmission line 204 may include a conducting piece that is separated from a ground plane by a dielectric layer known as the substrate.

The transmission line 204 is connected to the RF connector 202, which is further linked to another signal path medium i.e., waveguide 110. For example, as further discussed below, the RF connector 202 may include a conductive and/or dielectric housing and a feed-point (not shown) within the housing. Usually the conductive part of the housing is connected to ground. In this example, the RF connector 202 may be mounted on the PCB and the feed-point is linked to the transmission line 204. Furthermore, the housing of the RF connector 202 may be configured to receive the other end of the waveguide 110 to complete the mm-wave signal path between the RF module 112 and the antenna 104.

With continuing reference to FIG. 2, the RF module 112 is configured to transmit or receive mm-wave wireless signals. During transmission or reception, the RF module 112 may utilize different forms of digital modulation or demodulation, signal conversion methods, etc. to transmit or receive the mm-wave wireless signals. As described above, the RF module 112 may be integrated or assembled into the PCB of the portable device 102.

Figure 3:
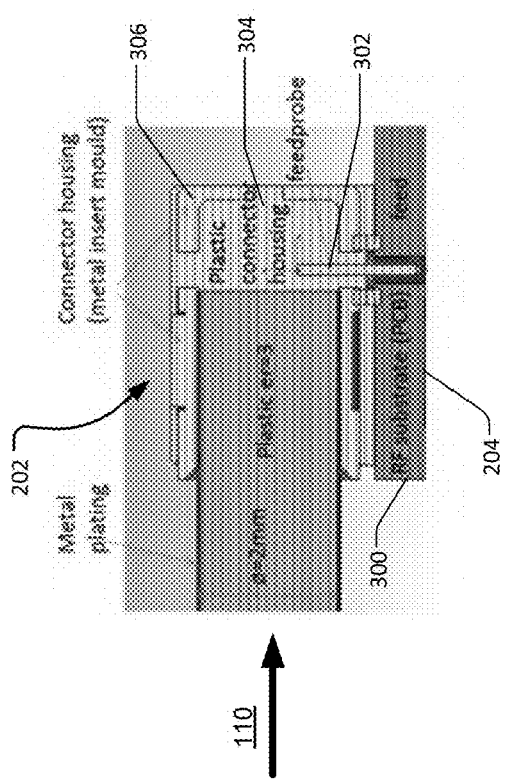
FIG. 3 is an example radio frequency (RF) connector as described in present implementations herein.

FIG. 3 illustrates an example RF connector 202 as described in present implementations herein. The RF connector 202, for example, is mounted in a PCB 300 that includes the transmission line 204. Furthermore, the RF connector 202 includes a feed-probe 302, a plastic connector housing 304, and a metal-part connector housing 306 that may receive and fit one end of the waveguide 110.

As discussed above, the RF connector 202 facilitates a transition signal path between two different signal path mediums. For example, the first signal path medium is the transmission line 204 while the other signal path medium is the waveguide 110. In this example, the RF connector 202 facilitates a substantially loss-free signal path transition for transmitting or receiving the mm-wave wireless signals.

In an implementation, the feed-probe 302 may be utilized to control signal parameters (e.g., power, phase, polarization, radiation pattern, etc.) of the passing mm-wave wireless signal during transmission or reception. Varying a depth of the feed-probe 302, for example, along a radiator slot (not shown) may change the amount of power in the transmitted mm-wave wireless signals. In another example, the feed-probe 302 may be utilized to choose which waveguide 110 is used during the transmission or reception. For example, the feed-probe 302 may totally close the radiator slot for a particular waveguide 110. In this example, the particular waveguide 110 may not transmit or receive mm-wave wireless signals through the open-end (i.e., antenna).

In an implementation, the metal part of the connector housing 306 is integrated to the plastic connector housing 304. In this implementation, the plastic connector housing 304 is fabricated to receive one end of the waveguide 110. For example, the one end of the waveguide 110 is circular in shape and as such, the plastic connector housing 304 may include a circular hole that receives and encloses the circular end of the waveguide 110. As discussed above, the opposite open-end of the waveguide 110 is utilized as the antenna and is disposed along a housing perimeter of the portable device.

Figure 4:
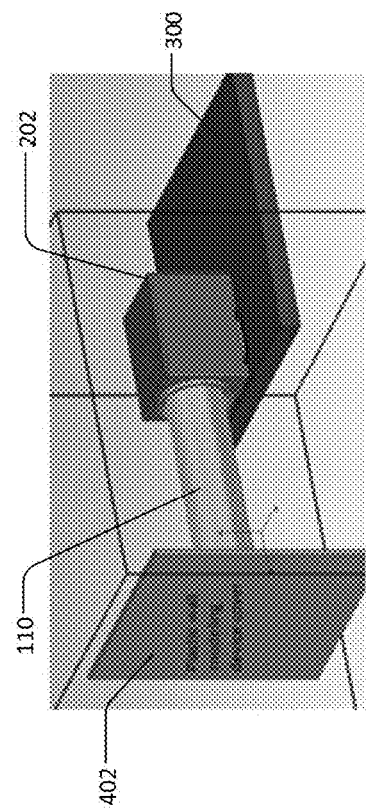
FIG. 4 is an example signal simulation for implementing millimeter-wave (mm-wave) wireless communication as described in present implementations herein.

FIG. 4 illustrates an example three dimensional electromagnetic simulation model 400 for implementing the mm-wave wireless communication as described in present implementations herein. As shown, the simulation model 400 illustrates a plastic cover 402 that is a representation of the housing perimeter or material cover of the portable device 102. Furthermore, FIG. 4 illustrates the waveguide 110, the mounted RF connector 202, and the PCB 300 that includes the integrated RF module 112.

The waveguide 110 may be a high-pass filter that is made of a low-loss plastic material and coated with a conducting material. For example, the waveguide 110 is built of a plastic material with a selected relative permittivity of $\in_r=3$ and Los Tan of 0.001 at 60 GHz operating frequency. Furthermore, the waveguide 110 has a diameter of 2 mm and a cut-off frequency approximately 51 GHz—which is suitable for the 60 GHz operating frequency. In this example, a physical configuration of the RF connector 202 is fabricated based upon these parameters of the waveguide 110. For example, the RF connector 202 has an opening that receives and fits the 2 mm diameter end of the waveguide 110. In this example, the RF connector 202 may further include radiator slots and multiple feed-probes where dimensions of the feed-probes are configured to correspond to the above physical configuration of the waveguide 110.

With continuing reference to FIG. 4, the plastic cover 402 may include a substantially thin plastic wall (e.g., 1 mm thick plastic wall) that simulates an outer cover of the portable device 102. Other plastic material parts other than the outer cover may be utilized in the example described in FIG. 4. For example, the waveguide 110 has an open-end that acts as the antenna. In this example, the antenna may be flushed to the plastic cover 402. The plastic cover 402 may be the outer cover edge, corner, top-side, back-side, outer surface, inner surface or a plastic material within the device depending upon an optimal routing of the waveguide 110 within the portable device 102.

Figure 5:
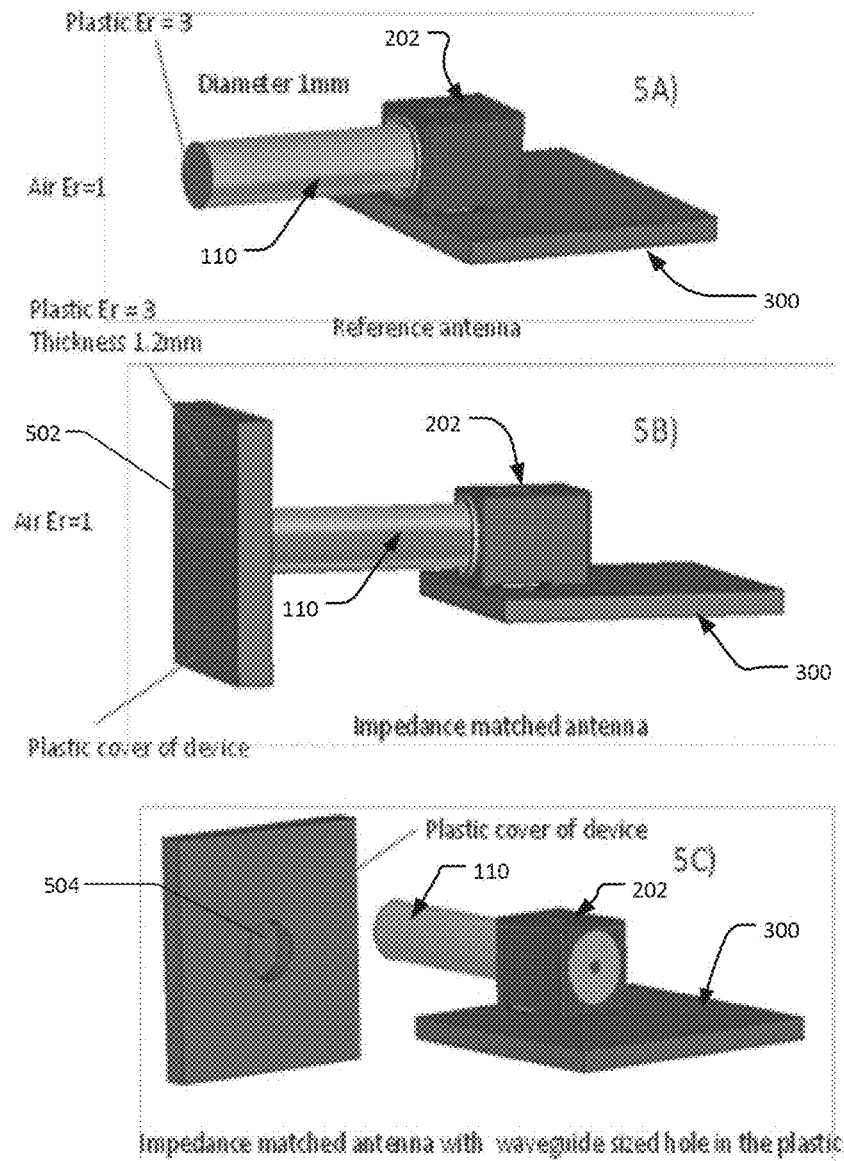
FIGS. 5A-5C illustrates different impedance matching implementations in an open-end of a waveguide as described in present implementations herein.

FIGS. 5A-5C illustrates different impedance matching implementations in the waveguide as described in present implementations herein.

As shown, FIG. 5A illustrates the waveguide 110 without an impedance matching, i.e. reference antenna. In this illustration, the mm-wave wireless signals during transmission or reception may encounter a standing wave signal reflection that may affect the signal parameters of the incoming or outgoing mm-wave wireless signals.

FIG. 5B further illustrates the waveguide 110 that is terminated by a plastic cover 502. For example, the plastic cover 502 is made of a plastic material that is disposed at the open-end (e.g., antenna 104-2) of the waveguide 110-2. In this example, the plastic cover 502, which is flushed to the antenna 104-2, may minimize the standing wave signal reflection within the waveguide 110-2.

FIG. 5C illustrates an alternative impedance matching at the antenna 104-2 of the waveguide 110-2. For example, the plastic cover 502 includes a hole 504, which is a cavity that is fabricated in the plastic material structure of the plastic cover 502. In this example, a physical dimension or configuration of the hole 504 may enclose the plugged open-end of the waveguide 110-2. In other words, the hole 504 has a diameter that fits the plugged open-end of the waveguide 110-2. With this configuration, the standing wave is furthermore minimized for maximum power transfer in the waveguide 110-2.

In another implementation, the plastic cover 502 is made of layers of different dielectric constants to further provide a good impedance matching at the open-end of the waveguide 110-2.

Figure 6A:
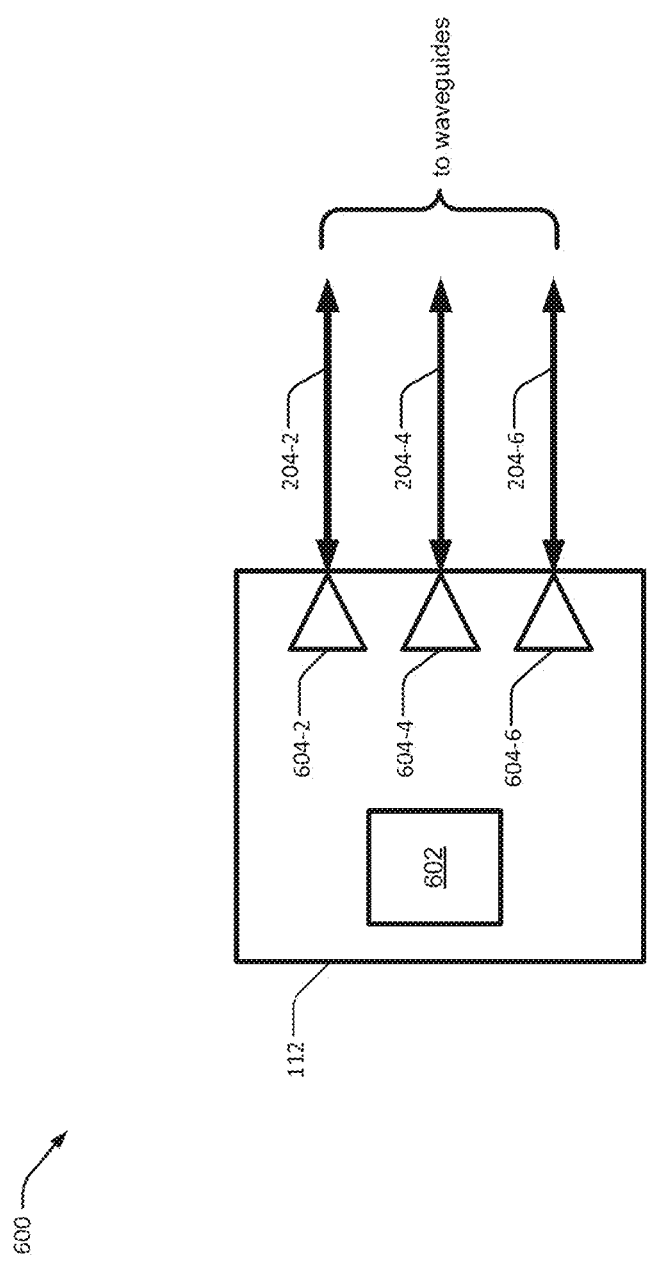
FIG. 6A is an example switching system in a radio frequency (RF) module as described in present implementations herein.

FIG. 6A illustrates an example switching system 600 in the RF module 112 as described in the implementations herein. As shown, the switching system 600 includes a signal processor 602, amplifiers 604, and the transmission lines 204.

In an implementation, the signal processor 602 manipulates the mm-wave wireless signal to be transmitted. For example, the signal processor 602 performs analog to digital conversion, digital modulation, multiplexing, etc. on the mm-wave wireless signal that is to be transmitted through the open-ends of the waveguide 110. In this example, the signal processor 602 may further utilize a particular waveguide 110 that the signal processor 602 selects during the transmission.

The selection of the waveguide 110 may be based upon determination and comparison of different wireless signal strengths at the open-ends of the waveguide 110. In another implementation, the signal processor 602 may utilize another form of detecting the wireless signal strengths such as the presence of another antenna (e.g., wireless-fidelity (Wi-Fi) antenna) in the portable device.

Figure 6B:
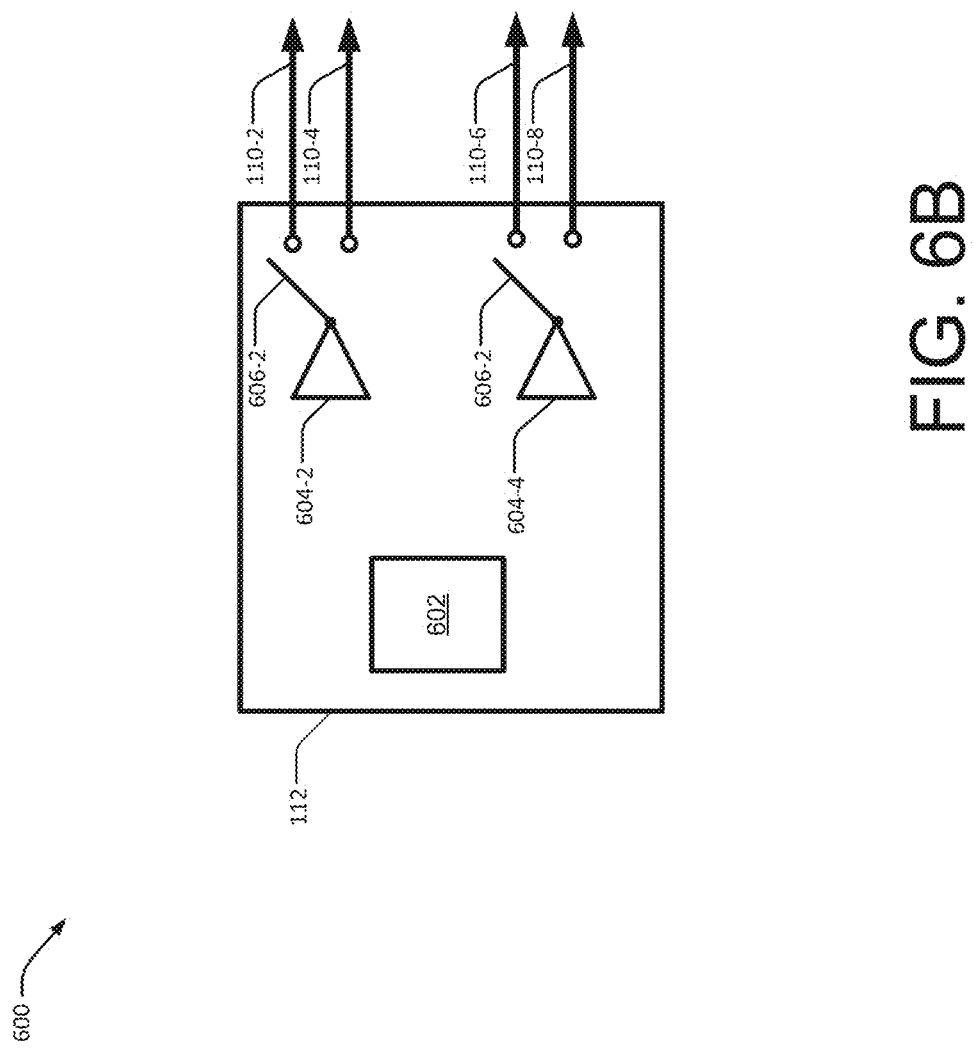
FIGS. 6B and 6C illustrate additional implementations of the example switching system in a radio frequency (RF) module as described in present implementations herein.
Figure 6C:
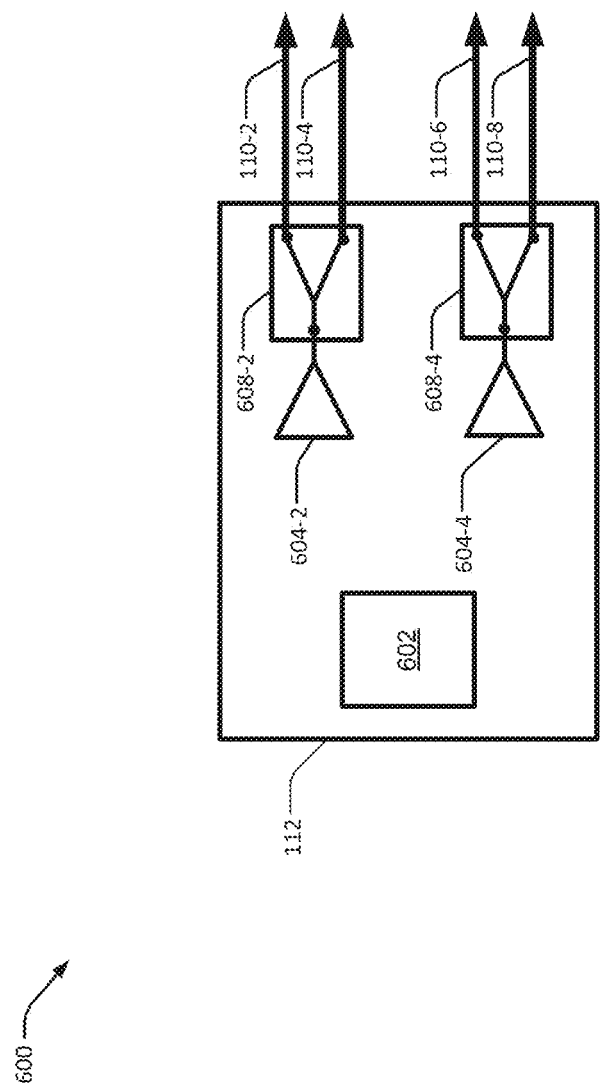

FIGS. 6B and 6C illustrate other implementations of the switching system 600.

For example, with the detected and selected waveguide 110—that includes the open-end with stronger wireless signal strength—in FIG. 6A, the signal processor 602 may utilize a switching component 606 in transmitting or receiving of the mm-wave wireless signals. As shown in FIG. 6B, the signal processor 602 may utilize the switching component 606-2 when using the waveguide 110-2 or 110-4; or the signal processor 602 may utilize the switching component 606-4 when using the waveguide 110-6 or 110-8.

Furthermore, a power divider component 608 may be utilized by the signal processor 602 in transmitting or receiving of the mm-wave wireless signals. As shown in FIG. 6C, the signal processor 602 may utilize the power divider component 608-2 when transmitting or receiving mm-wave wireless signals through the waveguides 110-2 and 110-4; or the signal processor 602 may utilize the power divider component 608-4 transmitting or receiving mm-wave wireless signals through the waveguides 110-6 and 110-8.

In an implementation, the signal processor 602 may be configured to turn off the other amplifiers 604 (e.g., amplifiers 604-4 and 604-6) and/or other waveguides 110 (e.g., waveguides 110-4 and 110-6) when the signal processor 602 has selected the amplifier 604-2 and corresponding waveguide 110-2 for transmission.

In another implementation, the signal processor 602 may utilize the feed-probe 302 to control or manipulate parameters of the mm-wave wireless signal or to shut-off or turn ON a particular waveguide 110.

Figure 7:
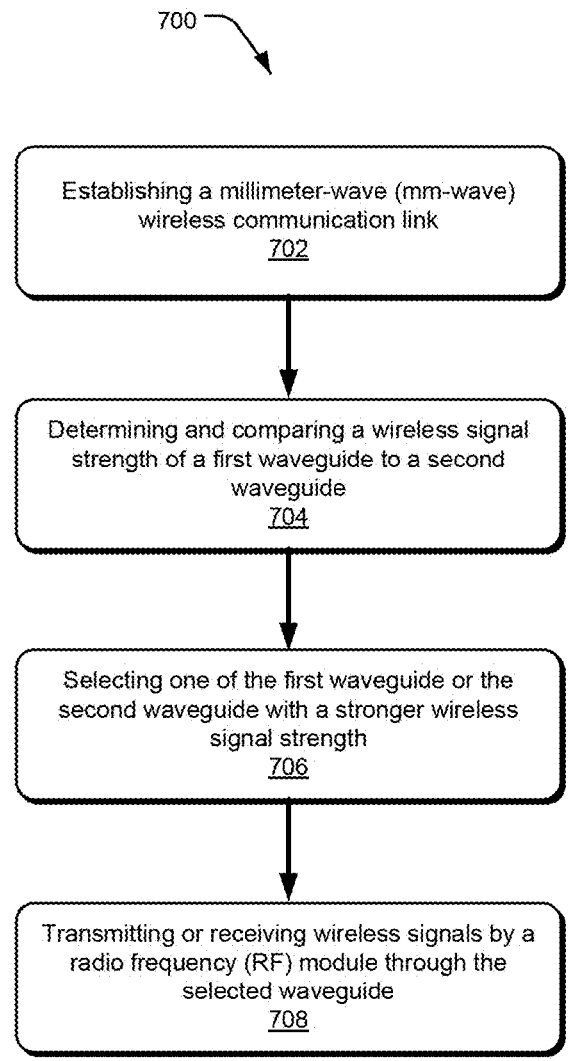
FIG. 7 is an example process chart illustrating an example method for implementing orientation-agnostic millimeter-wave (mm-wave) antenna in a portable device.

FIG. 7 shows an example process chart 700 illustrating an example method for implementing an orientation-agnostic millimeter-wave (mm-wave) antenna in a portable device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, establishing a mm-wave wireless communication link is performed. For example, a portable device (e.g., portable device 102) detects a mm-wave wireless signal. In this example, the portable device 102 may establish the mm-wave wireless communication link, for example, by sending a request-to-join an ad-hoc communication that is initiated by another portable device (e.g., portable device 106).

At block 704, determining and comparing a wireless signal strength from the open-end of the first waveguide to an open-end of a second waveguide within the portable device is performed. For example, the portable device 102 includes the first waveguide (e.g., waveguide 110-2) whose open-end (e.g., antenna 104-2) is directly within line of sight of the other transmitting portable device 106. In this example, the portable device 102 may compare the wireless signal strength from the first waveguide 110-2 to the second waveguide such as the waveguide 110-4 or waveguide 110-6.

At block 706, in response to the determined stronger wireless signal strength, selecting one of the first waveguide is performed. In the example above, the portable device 102 may select the waveguide 110-2 that includes a stronger wireless signal strength as compared to the other waveguides 110-4 and 110-6.

At block 708, transmitting or receiving mm-wave wireless signals through the selected waveguide is performed. In the example above, the portable device 102 through a RF module (e.g., RF module 112) may transmit or receive mm-wave wireless signals to or from the waveguide 110-2. Furthermore, the RF module 112 utilizes a RF connector (e.g., RF connector 202) in transmitting or receiving the mm-wave wireless signals through the selected waveguide 110-2. For example, the RF connector 202 facilitates mm-wave wireless signal transition signal path between two different mediums e.g., transmission line 204-2 and waveguide 110-2.

The following examples pertain to further embodiments:

Example 1 is a device comprising: a waveguide; a radio frequency (RF) module configured to transmit or receive wireless signals through the waveguide; and a RF signal transition that couples the RF module to the waveguide, the RF signal transition is a RF connector that comprises: a connector housing; and a feed-probe disposed within the connector housing, the feed-probe manipulates the transmission or reception of the wireless signals.

In Example 2, the device as recited in example 1, wherein the waveguide is disposed within the device, the waveguide extends to a chassis-outer surface or in close proximity to a chassis-inner surface within the device.

In Example 3, the device as recited in example 1, wherein the waveguide includes an open-end that acts as an antenna.

In Example 4, the device as recited in example 1, wherein the waveguide is a high-pass filter waveguide with a physical parameter that is configured to have a cut-off frequency below 60 GHz frequency.

In Example 5, the device as recited in example 1 further comprising a material layer of different dielectric constants, wherein the material layer is disposed to cover an open-end of the waveguide for impedance matching.

In Example 6, the device as recited in example 5, wherein the material layer at the open-end of the waveguide includes a cavity that fits a plugged open-end of the waveguide.

In Example 7, the device as recited in example 1, wherein the RF module detects and compares a wireless signal strength from the waveguide to a second waveguide.

In Example 8, the device as recited in example 7, wherein the RF module includes a switch to utilize one of the waveguide or the second waveguide having a higher wireless signal strength.

In Example 9, the device as recited in example 7, wherein the RF module includes a power divider that utilizes a single input port and multiple output ports, wherein the single input port is connected to the RF module while each output port is connected to a different waveguide.

Example 10 is a method of coupling in a device comprising: establishing a wireless communication link through an open-end of a first waveguide, the open-end is disposed along an outer or an inner housing perimeter of the device; determining and comparing a wireless signal strength from the open-end of the first waveguide to an open-end of a second waveguide within the device; selecting one of the first waveguide or the second waveguide that has a stronger wireless signal strength, in response to the determining and comparing of the wireless signal strength; and transmitting or receiving wireless signals to the selected waveguide, the selected waveguide is routed to connect a radio frequency (RF) module to the open-end of the selected waveguide.

In Example 11, the method as recited in example 10, wherein the establishing a wireless communication link includes a millimeter-wave (mm-wave) wireless communication link.

In Example 12, the method as recited in example 10, wherein the waveguide is a high-pass filter waveguide with a physical parameter that is configured to have a cut-off frequency below 60 GHz frequency.

In Example 13, the method as recited in example 10, wherein the transmitting or receiving wireless signals includes terminating the open-ends of the first waveguide and second waveguide with an impedance matching material, the impedance matching material includes layers of different dielectric constants that are disposed at the open-end of the first waveguide and second waveguide.

In Example 14, the method as recited in claim 13, wherein the impedance matching material is a plastic cover that includes a cavity wherein the open-ends of the first waveguide and second waveguides are plugged.

In Example 15, the method as recited in example 10, wherein the open-ends of the first waveguide and second waveguides include a tapered end.

In Example 16, the method as recited in example 10, wherein the RF module utilizes a RF connector that facilitates wireless signal transition between a transmission line and the selected waveguide, wherein the transmission line is a transmission line, a co-planar waveguide, a coaxial type, or another waveguide.

Example 17 is a antenna system comprising: a flexible waveguide; a terminating impedance-matching material that is disposed to cover an open-end of the flexible waveguide; a radio frequency (RF) signal transition that facilitates transmission and reception of wireless signal at the open-end of the flexible waveguide, the RF signal transition includes a RF connector that comprises: a connector housing; a feed-probe that is disposed within the connector housing, the feed-probe manipulates the transmission or reception of the wireless signals.

In Example 18, the antenna system as recited in example 17, wherein the impedance-matching material is a plastic cover that includes a cavity wherein the open-end of the flexible waveguide is plugged.

In Example 19, the antenna system as recited in example 17, wherein the open-end of the flexible waveguide includes a horn shape-configuration.

In Example 20, the antenna system as recited in example 17, wherein the feed-probe alters a phase shift of the wireless signals.

What is claimed is:

1. A device comprising:
   a waveguide;
   a radio frequency (RF) module configured to transmit or receive wireless signals through the waveguide; and
   a RF signal transition that couples the RF module to the waveguide, the RF signal transition is a RF connector that comprises:
      a connector housing; and
      a feed-probe disposed within the connector housing, the feed-probe manipulates the transmission or reception of the wireless signals;
   wherein the waveguide comprises an open-end that acts as an antenna.

2. The device as recited in claim 1, wherein the waveguide is a high-pass filter waveguide with a physical parameter that is configured to have a cut-off frequency below 60 GHz frequency.

3. The device as recited in claim 1 further comprising a material layer of different dielectric constants, wherein the material layer is disposed to cover an open-end of the waveguide for impedance matching.

4. The device as recited in claim 3, wherein the material layer at the open-end of the waveguide comprises a cavity that fits a plugged open-end of the waveguide.

5. The device as recited in claim 1, wherein the RF module detects and compares a wireless signal strength from the waveguide to a second waveguide.

6. The device as recited in claim 5, wherein the RF module comprises a switch to utilize one of the waveguide or the second waveguide having a higher wireless signal strength.

7. The device as recited in claim 5, wherein the RF module comprises a power divider that utilizes a single input port and multiple output ports, wherein the single input port is connected to the RF module while each output port is connected to a different waveguide.

8. A method of coupling in a device comprising:
   establishing a wireless communication link through an open-end of a first waveguide, the open-end is disposed along an outer or an inner housing perimeter of the device;
   determining and comparing a wireless signal strength from the open-end of the first waveguide to an open-end of a second waveguide within the device;
   selecting one of the first waveguide or the second waveguide that has a stronger wireless signal strength, in response to the determining and comparing of the wireless signal strength; and
   transmitting or receiving wireless signals to the selected waveguide, the selected waveguide is routed to connect a radio frequency (RF) module to the open-end of the selected waveguide.

9. The method as recited in claim 8, wherein the establishing a wireless communication link comprises a millimeter-wave (mm-wave) wireless communication link.

10. The method as recited in claim 8, wherein the waveguide is a high-pass filter waveguide with a physical parameter that is configured to have a cut-off frequency below 60 GHz frequency.

11. The method as recited in claim 8, wherein the transmitting or receiving wireless signals comprises terminating the open-ends of the first waveguide and second waveguide with an impedance matching material, the impedance matching material comprises layers of different dielectric constants that are disposed at the open-end of the first waveguide and second waveguide.

12. The method as recited in claim 11, wherein the impedance matching material is a plastic cover that comprises a cavity wherein the open-ends of the first waveguide and second waveguides are plugged.

13. The method as recited in claim 8, wherein the open-ends of the first waveguide and second waveguides comprise a tapered end.

14. The method as recited in claim 8, wherein the RF module utilizes a RF connector that facilitates wireless signal transition between a transmission line and the selected waveguide, wherein the transmission line is a transmission line, a co-planar waveguide, a coaxial type, or another waveguide.

15. An antenna system comprising:
   a flexible waveguide;
   a terminating impedance-matching material that is disposed to cover an open-end of the flexible waveguide;
   a radio frequency (RF) signal transition that facilitates transmission and reception of wireless signal at the open-end of the flexible waveguide, the RF signal transition comprises a RF connector that comprises:
      a connector housing;
      a feed-probe that is disposed within the connector housing, the feed-probe manipulates the transmission or reception of the wireless signals.

16. The antenna system as recited in claim 15, wherein the impedance-matching material is a plastic cover that comprises a cavity wherein the open-end of the flexible waveguide is plugged.

17. The antenna system as recited in claim 5, wherein the open-end of the flexible waveguide comprises a horn shape-configuration.

18. The antenna system as recited in claim 15, wherein the feed-probe alters a phase shift of the wireless signals.

\* \* \* \* \*